(12) United States Patent
Staun et al.

(10) Patent No.: US 11,109,712 B2
(45) Date of Patent: Sep. 7, 2021

(54) MICROWAVE OVEN WITH TOASTER

(71) Applicant: Midea Group Co., Ltd., Foshan (CN)

(72) Inventors: Paul R. Staun, Louisville, KY (US); Brian Langness, Shelbyville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 431 days.

(21) Appl. No.: 16/215,096

(22) Filed: Dec. 10, 2018

(65) Prior Publication Data

US 2020/0178732 A1 Jun. 11, 2020

(51) Int. Cl.
*H05B 6/64* (2006.01)
*A47J 37/08* (2006.01)
*H05B 6/80* (2006.01)

(52) U.S. Cl.
CPC ............ *A47J 37/0807* (2013.01); *H05B 6/80* (2013.01); *H05B 2206/042* (2013.01)

(58) Field of Classification Search
CPC .. H05B 6/6402; H05B 6/6408; H05B 6/6435; H05B 6/6438; H05B 6/645; H05B 6/6452; H05B 6/6458; H05B 6/647; H05B 6/6473; H05B 6/6479; H05B 6/6482; H05B 6/6485; H05B 6/80; H05B 2206/042; H05B 2206/044; A47J 37/0629; A47J 37/0641; A47J 37/0664; A47J 37/0694; A47J 37/0807
USPC ......... 219/678–681, 685, 752–756, 762–763
See application file for complete search history.

(56) References Cited

U.S. PATENT DOCUMENTS

| | | | |
|---|---|---|---|
| 2,504,445 A | 4/1950 | Pavnica | |
| 3,333,531 A | 8/1967 | Reuther | |
| 4,798,927 A * | 1/1989 | Kaminaka | H05B 6/645 |
| | | | 219/685 |
| 5,558,797 A * | 9/1996 | Takagi | H05B 6/6411 |
| | | | 219/705 |
| 5,938,959 A | 8/1999 | Wang | |
| 5,967,021 A | 10/1999 | Yung | |
| 6,539,840 B2 | 4/2003 | Choi et al. | |
| 6,696,676 B1 * | 2/2004 | Graves | F24C 7/087 |
| | | | 219/685 |
| 6,864,470 B2 | 3/2005 | Back | |
| 7,041,949 B2 | 5/2006 | Kim | |
| 7,067,777 B2 | 6/2006 | Lee et al. | |
| 2003/0121904 A1 * | 7/2003 | Ingemanson | H05B 3/0076 |
| | | | 219/492 |
| 2004/0050841 A1 | 3/2004 | Han et al. | |
| 2005/0133499 A1 | 6/2005 | Yang et al. | |

(Continued)

FOREIGN PATENT DOCUMENTS

| | | |
|---|---|---|
| CN | 1458459 A | 11/2003 |
| CN | 200972170 Y | 11/2007 |

(Continued)

OTHER PUBLICATIONS

International Search Report and Written Opinion issued in Application No. PCT/CN2019/091771 dated Sep. 11, 2019.

(Continued)

*Primary Examiner* — Hung D Nguyen
(74) *Attorney, Agent, or Firm* — Middleton Reutlinger

(57) ABSTRACT

An appliance includes a microwave oven and a toaster oven apparatus in combination, the toaster oven being contained entirely within the interior of the microwave oven.

19 Claims, 18 Drawing Sheets

(56) References Cited

U.S. PATENT DOCUMENTS

2006/0081235 A1    4/2006  Lundh et al.
2015/0053093 A1    2/2015  Chang
2016/0029829 A1    2/2016  Klein
2017/0318629 A1   11/2017  Mohseni
2018/0017268 A1*   1/2018  Adelmann ............ F24C 15/162

FOREIGN PATENT DOCUMENTS

| CN | 101469872 A | 7/2009 |
| CN | 108236386 A | 7/2018 |
| CN | 208015766 U | 10/2018 |
| JP | 07318073 A | 12/1995 |
| WO | WO2009085038 A1 | 7/2009 |

OTHER PUBLICATIONS

"LG Microwave Toaster" http://www.cocoonzone.com/housewares/zoom/microwave_toaster.htm. Retrieved on Jan. 4, 2018.

* cited by examiner

MICROWAVE OVEN WITH TOASTER

BACKGROUND OF THE INVENTION

In the appliance manufacturing industries there is a desire to provide multi-functional devices, particularly for kitchen appliance applications as a means of saving counter and wall space. For example, refrigerators with ice and water dispensers and ovens that serve as conventional ovens, convection ovens, and microwave ovens have become ubiquitous in many homes.

Most modern kitchens utilize a microwave oven, either as a stand-alone device placed on a counter or as part of a conventional oven as well as a toaster or toaster oven, since the two devices serve two quite different cooking functions. Even where a microwave oven is built-in to the wall or mounted above a stove or cooktop the use of a separate toaster oven requires additional counter space that can be at a premium in small kitchens.

Some appliance manufacturers have attempted to solve this problem by providing a microwave oven and toaster oven combination appliance, whereby the toasting compartment is separate and distinct from the microwave compartment. However, this solution has many drawbacks. For example, since it is necessary to provide two separate cooking compartments the overall size of the appliance can be quite large, thereby obviating the perceived advantage. Furthermore, in an effort to reduce the overall size some manufacturers have provided a small toast compartment, which prevents the user from toasting or cooking items such as 10-12" personal pizzas and tortillas.

From the foregoing it can readily be seen that there is a need in the art for a microwave oven in combination with a toaster oven that utilizes the same cooking compartment for both operations.

SUMMARY OF THE INVENTION

The present disclosure is related to systems and apparatus for providing a combination microwave oven with an integral toaster oven. The system described herein provides various apparatus for toasting a food item in the interior of a conventional microwave oven, thus providing for a dual-purpose cooking appliance that can replace existing separate microwave and toaster ovens thereby saving kitchen space.

In various embodiments, the system disclosed herein provides at least a pair of spaced heating elements mounted within the interior of a conventional microwave oven that may be operated as a toaster or toaster oven by a control system provided to operate and control both the microwave and toaster functions of the system. In various embodiments the lower heating element may be recessed into a back wall of the microwave interior and deployed for use when desired. In some embodiments a switch or other indicator is monitored by the control system to determine whether the toast function of the system is being employed, and thus disable microwave operation.

In other embodiments, the system and methods disclosed herein may include an upper heating element or elements that are recessed in an upper wall or roof of the microwave interior and covered by a mesh or grid to prohibit transmission of microwave radiation to the heating elements. In these embodiments, a lower heating element or elements may be spaced from the upper element by an adjustable tray or shelf that pivots or hinges away from the microwave interior to a deployed position. The tray may further include a wire rack or shelf that allows for food placement between the upper and lower elements.

In some aspects and embodiments the lower heating elements may be mounted below a glass floor or plate in the bottom of the microwave, and covered by a mesh or grid to prevent microwave radiation from damaging the lower element. In these embodiments a wire rack for positioning a food item to be cooked may be provided to be placed between the upper and lower elements.

In various aspects and embodiments the system described herein may include a drop-down toaster compartment that includes an upper and lower tray having integral heating elements. The toaster compartment may be secured to the microwave upper interior surface by a plurality of pivoting arms that permits the compartment to be hinged into place when in use and thence stowed on top of the microwave interior when not in use. In some aspects and embodiments the toaster compartment upper and lower trays are adjustably spaced to provide for different toast levels and different sizes for food items to be cooked.

As used herein for purposes of the present disclosure, the term "appliance" should be understood to be generally synonymous with and include any device that consumes electrical power and can be connected to an electrical circuit or battery, for example one used in a residential or commercial setting to accomplish work. The appliances referred to herein may include a plurality of electrically operated components powered by the circuit, the components operable by manipulation of control knobs, user interfaces or selectors. The appliance may also include a processor or processors that operate, control and monitor the appliance and the various components and functions thereof referred to throughout this specification.

The term "microwave oven" is used herein generally to describe various conventional appliances that are typically used in cooking applications and supply microwave energy to heat an item or items to a desired temperature. Microwave ovens include any conventional oven that utilizes microwaves, including but not limited to on the counter and built-in apparatuses.

The term "controller" or "processor" is used herein generally to describe various apparatus relating to the operation of the system and the appliances referred to herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The appliances, controllers and processors referred to herein may be operatively connected to the Internet.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION OF THE INVENTION

Referring to drawing FIGS. 1-18, and in accordance with various aspects and embodiments of the invention, a system 10 for a combination microwave and toaster oven appliance 100 is described. In various embodiments the appliance 100 in which system 10 is implemented may include a controller 200 integral to appliance 100 that operates appliance 100 and implements various embodiments and aspects of system 10 as described herein.

Figure 16:
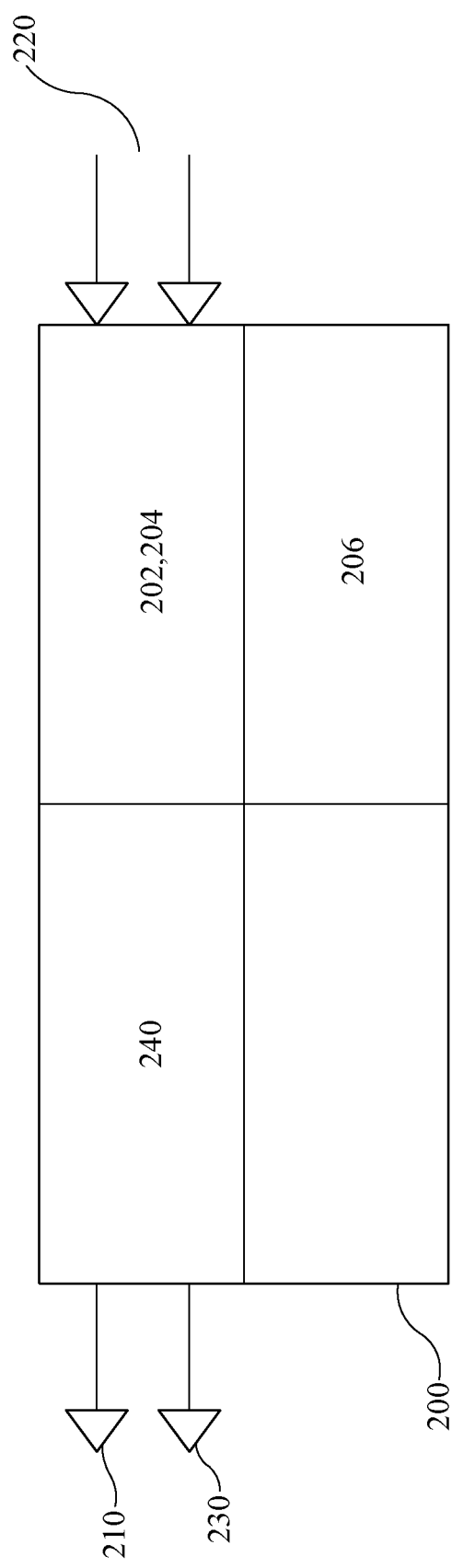
FIG. 16 is a block diagram of an exemplary control system for a microwave toaster oven in accordance with some aspects and embodiments.

FIG. 16 illustrates an exemplary oven 100 hardware environment for controlling the various function and features of appliance 100 as detailed further herein below. The system 10 may include a controller 200, a processor or processors 202 and concomitant memory 204. Appliance 100 may further comprise a plurality of signal outputs 210 and signal inputs 220 that may be operatively connected to a plurality of appliance 100 components to monitor and direct system 10 operation. Furthermore, in some embodiments controller 200 may include a wireless or hard-wired communications interface 230 that enables controller 200 to communicate with external devices or communications networks such as the internet, that may be integrated into system 10.

Additionally, controller 200 may be equipped with an operator or user interface 240 to provide audible or visual feedback to a user as well as provide a user the ability to provide instructions or commands to controller 200. Exemplary but non-limiting user interfaces that may be employed include a mouse, keypads, touch-screens, keyboards, switches and/or touch pads. Any user interface may be employed for use in the invention without departing from the scope thereof. It will be understood that FIG. 1 constitutes, in some respects, an abstraction and that the actual organization of the components of appliance 100 and controller 200 may be more complex than illustrated.

The processor 202 may be any hardware device capable of executing instructions stored in memory 204 or data storage 206 or otherwise processing data. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the communication interface 230.

The communication interface 230 may include one or more devices for enabling communication with other hardware devices. For example, the communication interface 230 may include a network interface card (NIC) configured to communicate according to the Ethernet protocol. Additionally, the communication interface 230 may implement a TCP/IP stack for communication according to the TCP/IP protocols. Various alternative or additional hardware or configurations for the communication interface 230 will be apparent.

The storage 206 may include one or more machine-readable storage media such as read-only memory (ROM), random-access memory (RAM), magnetic disk storage media, optical storage media, flash-memory devices, or similar storage media. In various embodiments, the storage 206 may store instructions for execution by the processor 202 or data upon with the processor 202 may operate. For example, the storage 206 may store a base operating system for controlling various basic operations of the hardware. Other instruction sets may also be stored in storage 206 for executing various functions of system 10, in accordance with the embodiments detailed below.

It will be apparent that various information described as stored in the storage 206 may be additionally or alternatively stored in the memory 204. In this respect, the memory 204 may also be considered to constitute a "storage device" and the storage 206 may be considered a "memory." Various other arrangements will be apparent. Further, the memory 204 and storage 206 may both be considered to be "non-transitory machine-readable media." As used herein, the term "non-transitory" will be understood to exclude transitory signals but to include all forms of storage, including both volatile and non-volatile memories.

While the controller 200 is shown as including one of each described component, the various components may be duplicated in various embodiments. For example, the processor 202 may include multiple microprocessors that are configured to independently execute the methods described herein or are configured to perform steps or subroutines of the methods described herein such that the multiple processors cooperate to achieve the functionality described herein.

Referring now to FIGS. 1-5, and in accordance with some aspects and embodiments, a combination microwave 100 and toaster oven 110 includes an oven interior compartment 102 that encloses the food (not shown) being cooked, as is known in the art. It should be noted that the combination oven 100 comprises a conventional microwave oven 100 along with its attendant structure and controls. In these embodiments a conventional turntable 106 may be provided as an operating feature of microwave oven 100. Combination oven 100 further includes a toaster 110 that incorporates a fold-down rear door 120 in a rear wall 104 of oven 100 that includes a knob or fastener 122 for opening, closing and securing door 120 in rear wall 104. In some embodiments door 120 is simply hinged to rotate upwardly and downwardly, and fit flush with rear wall 104 when in an up or stowed position.

Figure 1:
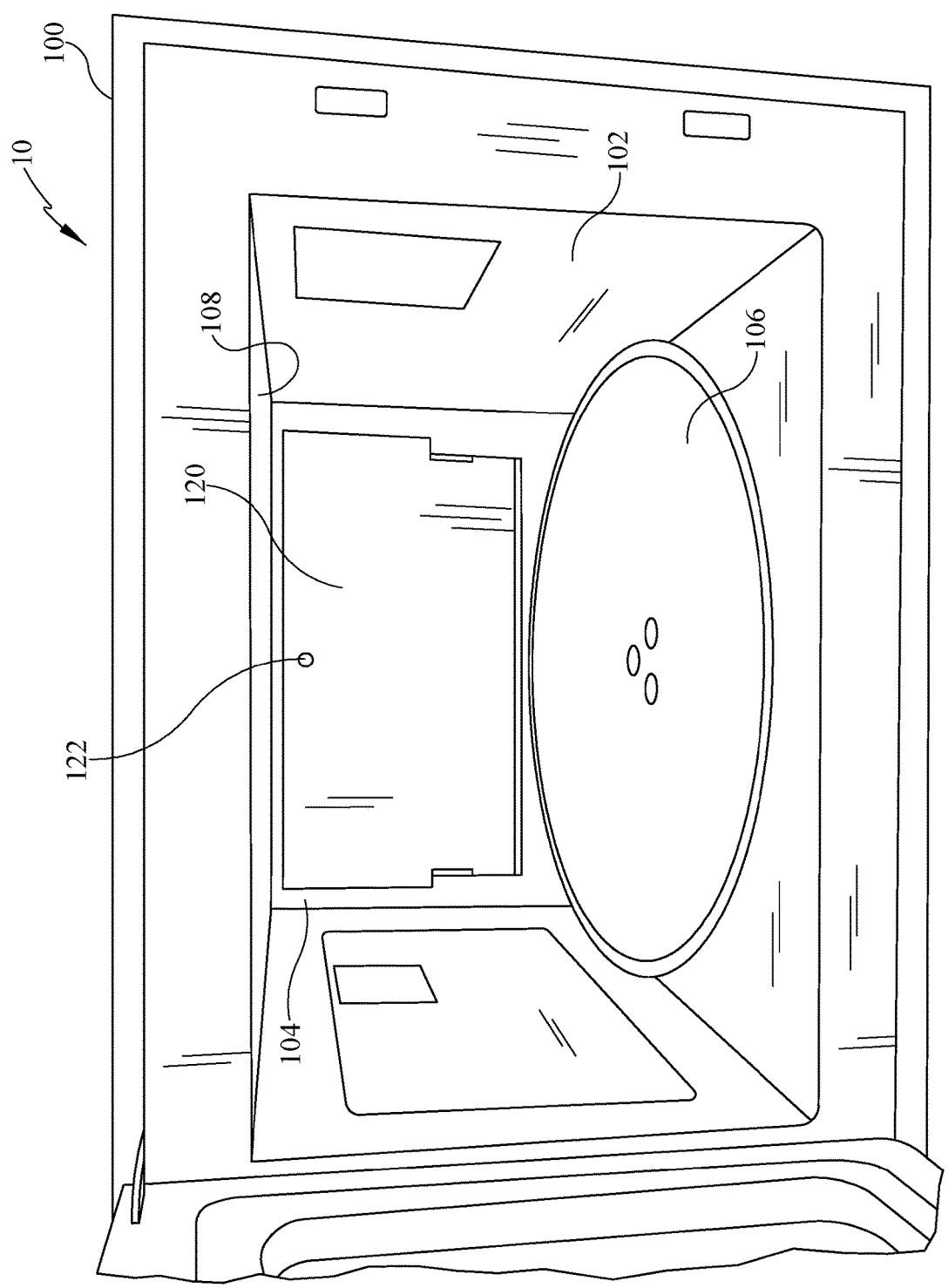
FIG. 1 is a perspective view of a microwave toaster oven in accordance with various embodiments.
Figure 2:
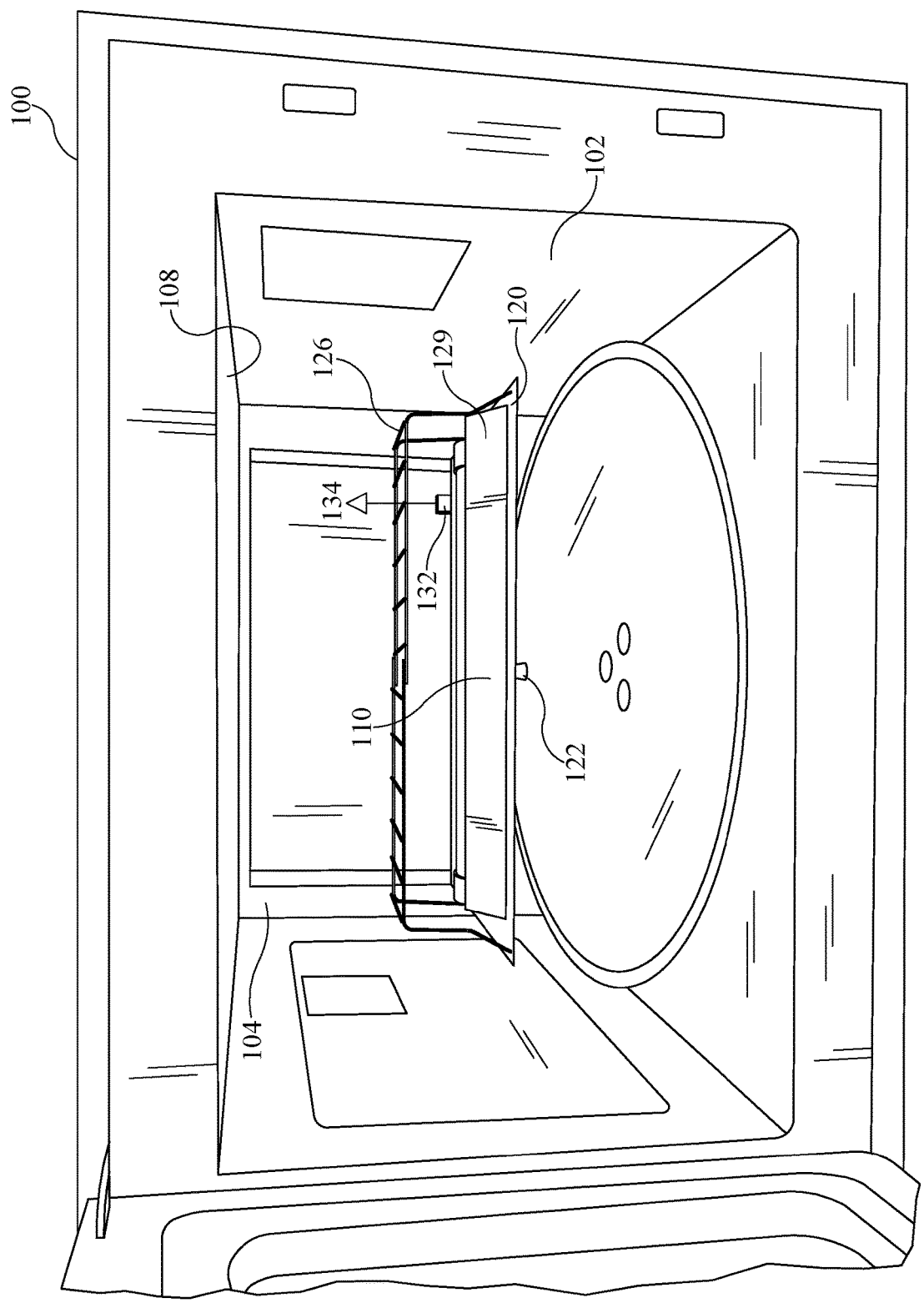
FIG. 2 is a perspective view of a microwave toaster oven in accordance with various embodiments.
Figure 3:
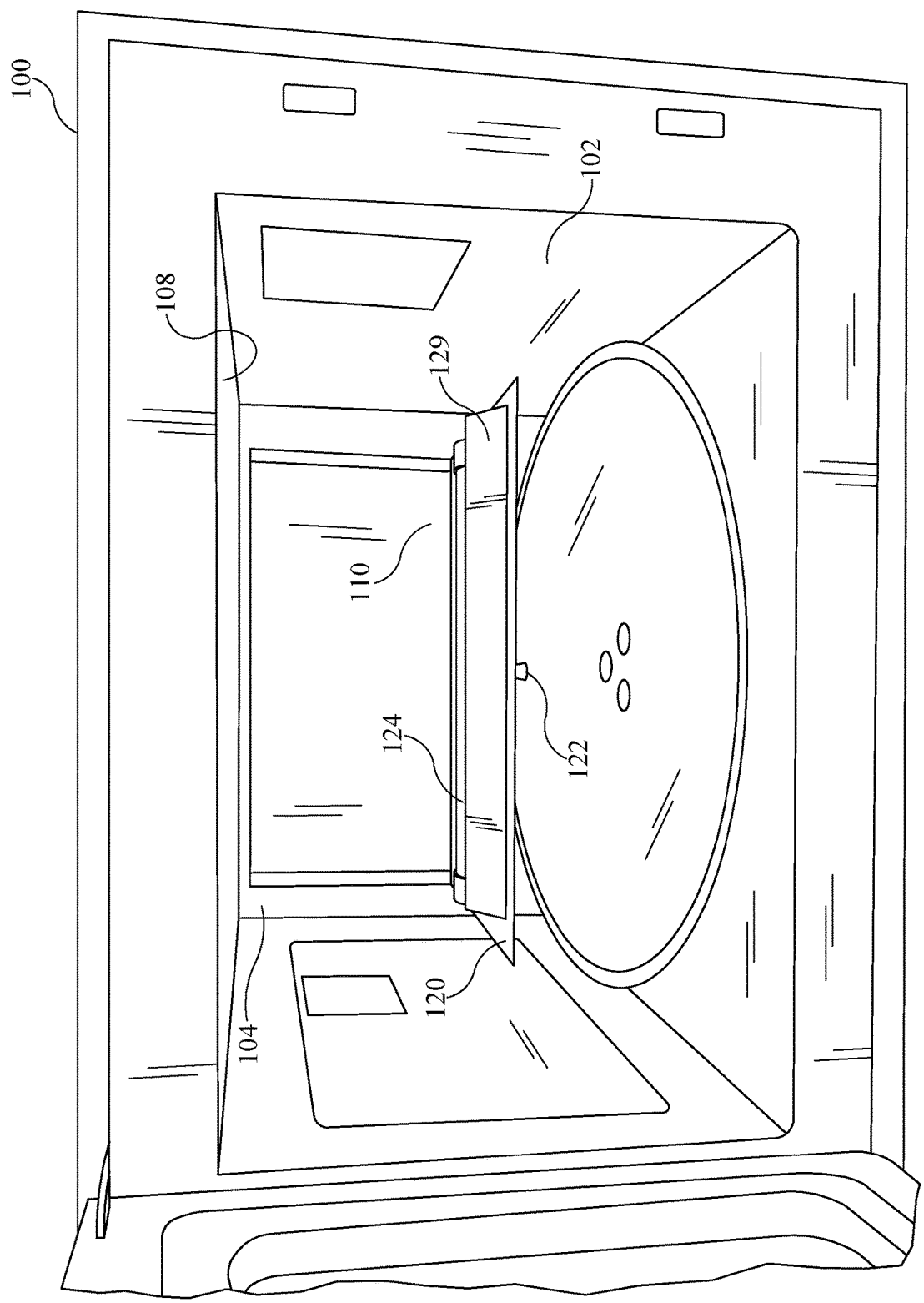
FIG. 3 is a perspective view of a microwave toaster oven in accordance with various embodiments.
Figure 4:
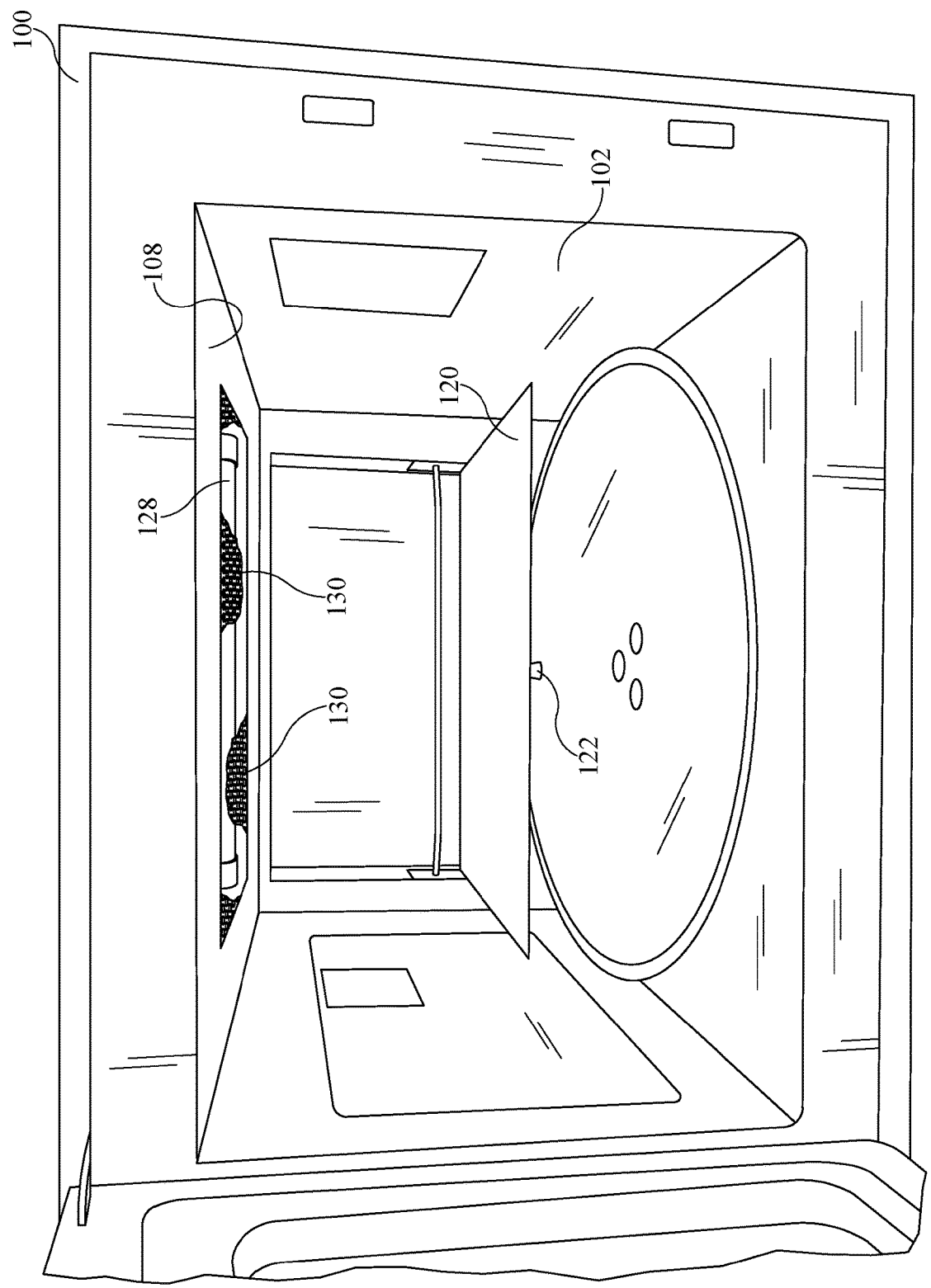
FIG. 4 is a perspective view of a microwave toaster oven in accordance with various embodiments.

As best depicted in FIGS. 2-5 and in accordance with various embodiments, in the open position door 120 exposes a lower toaster heating element 124 and a wire rack 126 positioned above and spaced away from lower heating element 124. As depicted in FIG. 4, an upper heating element 128 is also provided, recessed in a top wall 108 of oven 100, for heating food placed on rack 126. Furthermore, a ceiling grid 130 is provided to cover upper heating element 128 that blocks microwave radiation from reaching heating element 128.

In various aspects heating elements 124 and 128 may be quartz heating elements, resistive heating elements, or any of a wide variety of electrically powered heating elements without departing from the scope of the invention. In some aspects and embodiments, controller 200 is provided with a suitable instruction set that prohibits the operation of toaster 110 when microwave oven 100 is being used. Furthermore, in some embodiments a sensor or switch 132, for example a limit or proximity switch 132, may be mounted or secured proximate door 120 to sense the opening and closing thereof. Switch 132 may provide an output 134 to an input 220 of controller 200 that is indicative of door 120 being in a closed position. Controller 200 includes instructions to disable the operation of microwave 100 unless switch 132 indicates that door 120 is in the up or stowed position, thereby providing for safe operation of both ovens.

In additional embodiments controller 200 may also provide a plurality of outputs 210 to supply power to lower and upper heating elements 124, 128 based on user input to the oven. In some embodiments a plurality of toast darkness setting may be provided to a user through user interface 240 that enables a user to select, for example, light, medium or dark toast, or even a broil function wherein only upper element 128 is powered. In this fashion, toaster 110 may function as an independent toaster oven while being incorporated into a microwave oven 100 interior 102.

Figure 5:
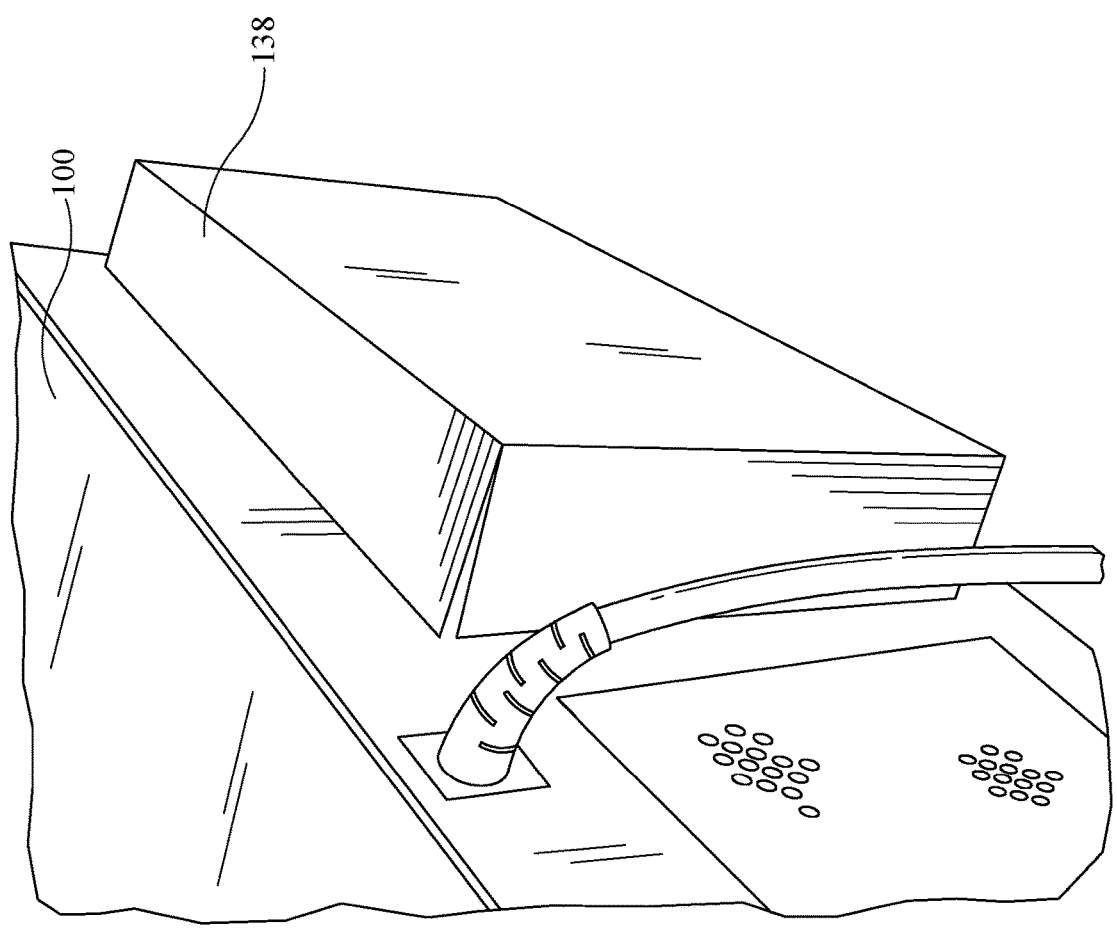
FIG. 5 is perspective rear view of a microwave toaster oven in accordance with some aspects and embodiments.

In some aspects and embodiments as depicted in FIG. 5, toaster 110 folding door 120, lower heating element 124 and wire rack 126 may be provided with an enclosure 138 that extends slightly from the back of microwave oven 100. This enclosure 138 provides space to stow door 120 and lower heating element 124 when not in use while only slightly increasing the overall exterior dimensions of microwave oven 100.

Figure 6:
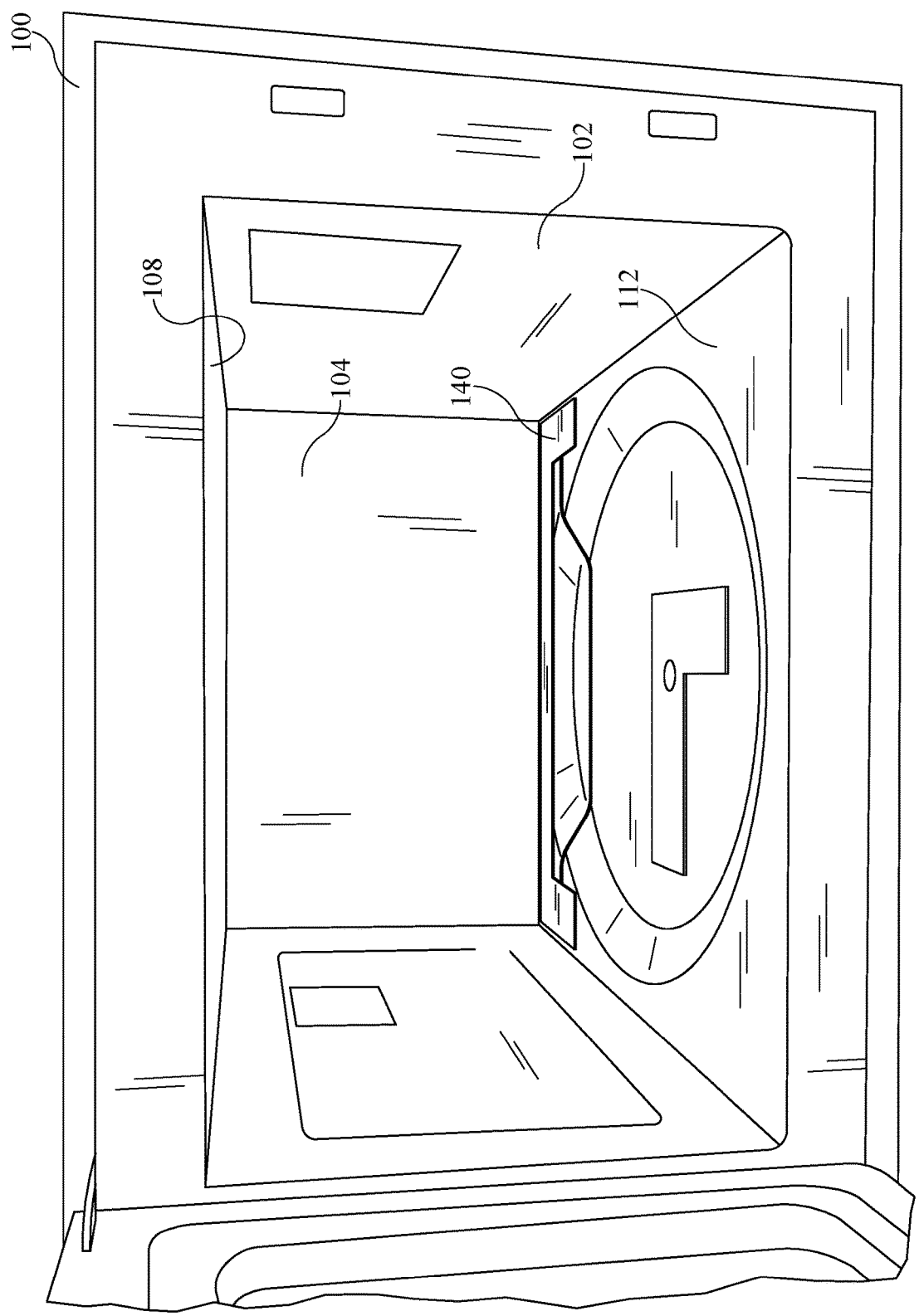
FIG. 6 is a perspective view of a microwave toaster oven in accordance with various embodiments.
Figure 7:
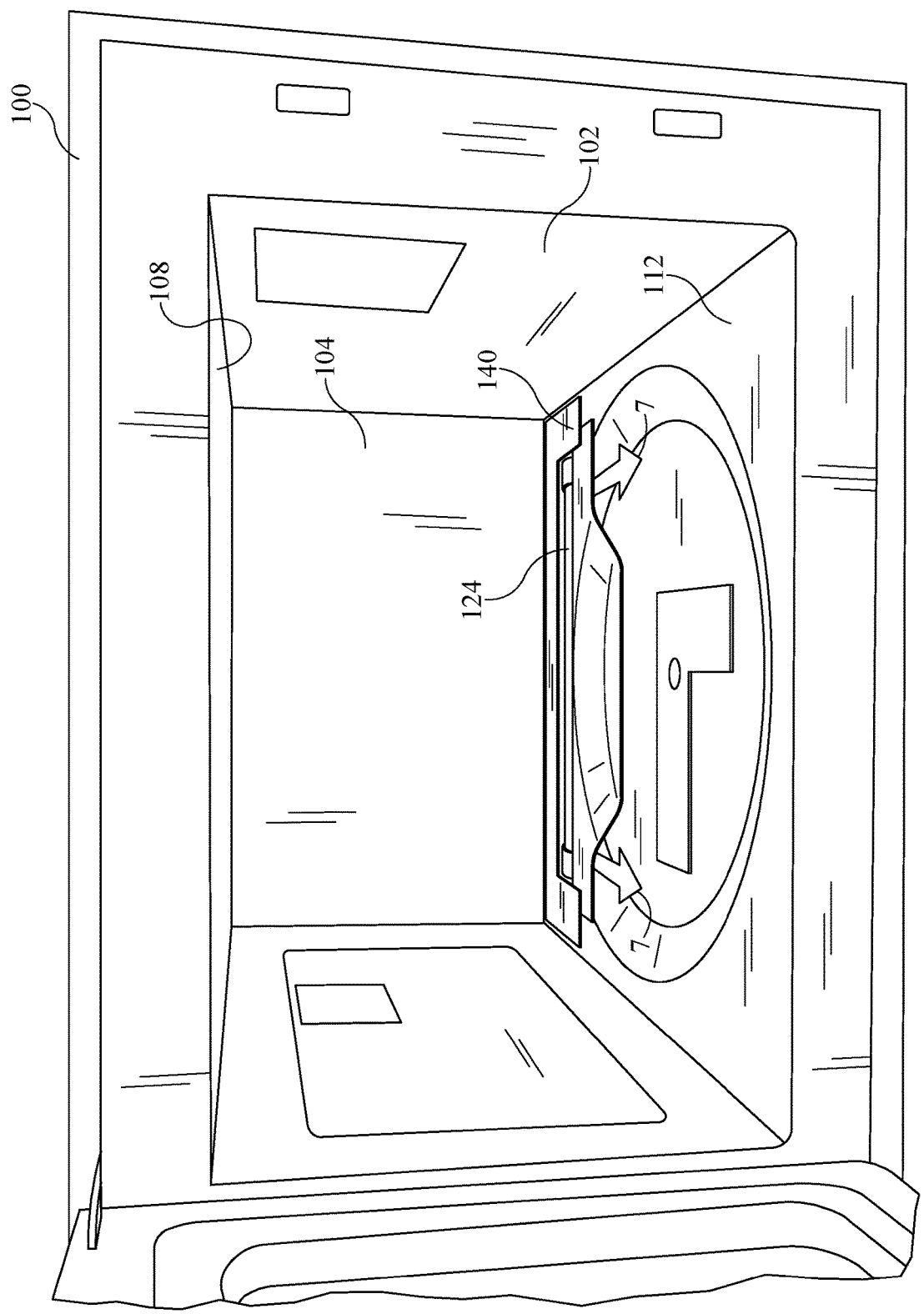
FIG. 7 is a perspective view of a microwave toaster oven in accordance with various embodiments.
Figure 8:
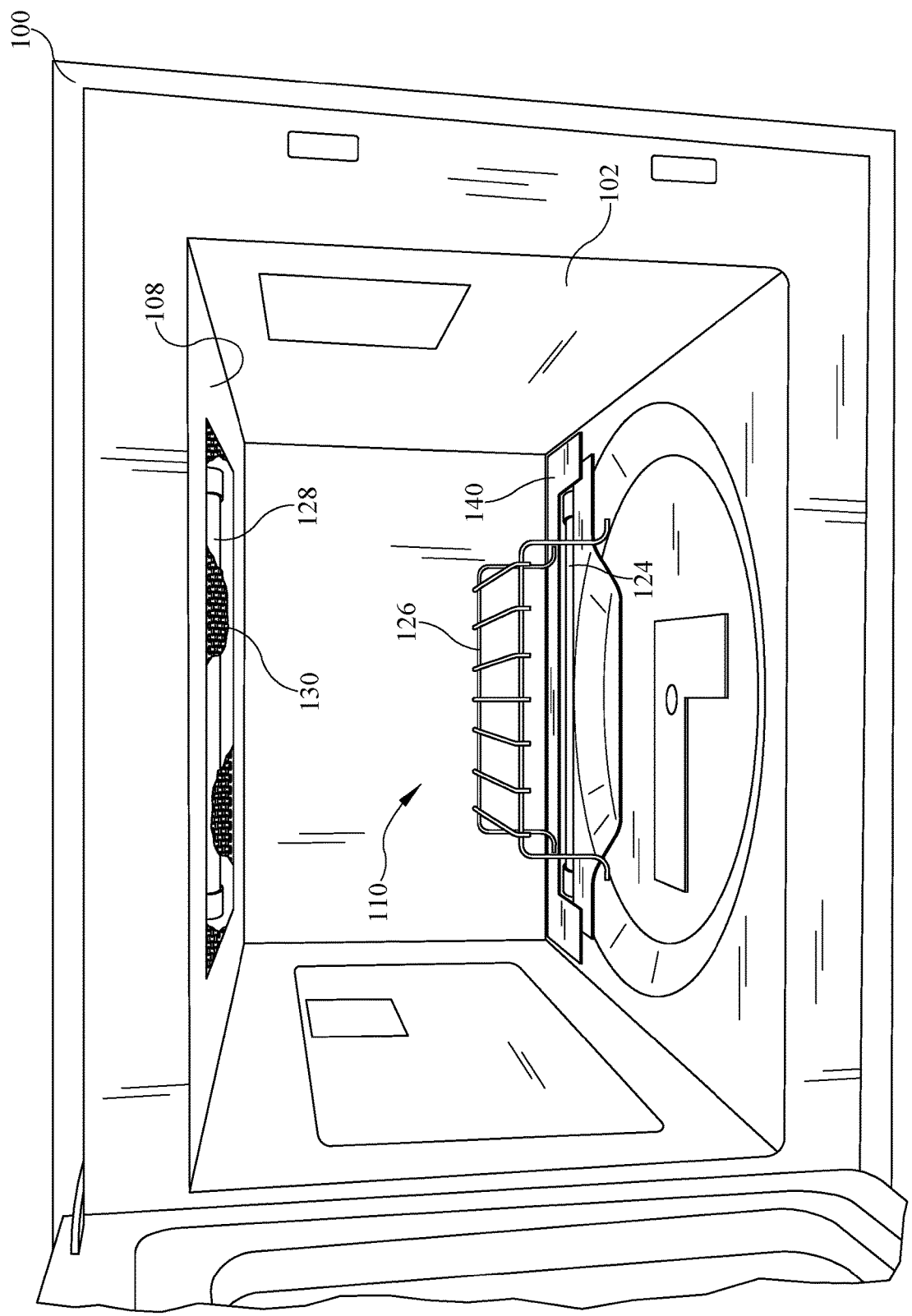
FIG. 8 is a perspective view of a microwave toaster oven in accordance with various embodiments.

Referring now to FIGS. 6-8 and in accordance with some embodiments, oven 100 toaster 110 may be equipped with a slide out tray 140 that is capable of being stowed in a closed position proximate back wall 104 of oven interior 102 in the oven floor 112 until required, as best seen in FIG. 6. Slide out tray 140 may be manually or electrically deployed for use as shown in FIGS. 7 and 8, whereby tray 140 moves outwardly into interior 102 of oven 100 as shown by the arrows 7 of FIG. 7. In one embodiment processor 200 provides an output to a solenoid or motor to push and pull tray 140 to deployed or stowed positions. Lower heating element 124 is mounted to tray 140 for toaster oven 110 operation. In this embodiment of the invention, upper heating element 128 may be positioned in a top portion of oven 110 with the attendant grid 130 for microwave radiation protection, as depicted in FIG. 8. Controller 200 may be provided with instructions to disable the operation of microwave 100 unless slide out tray 140 is in the stowed position, thereby providing for safe operation of both ovens.

Figure 9:
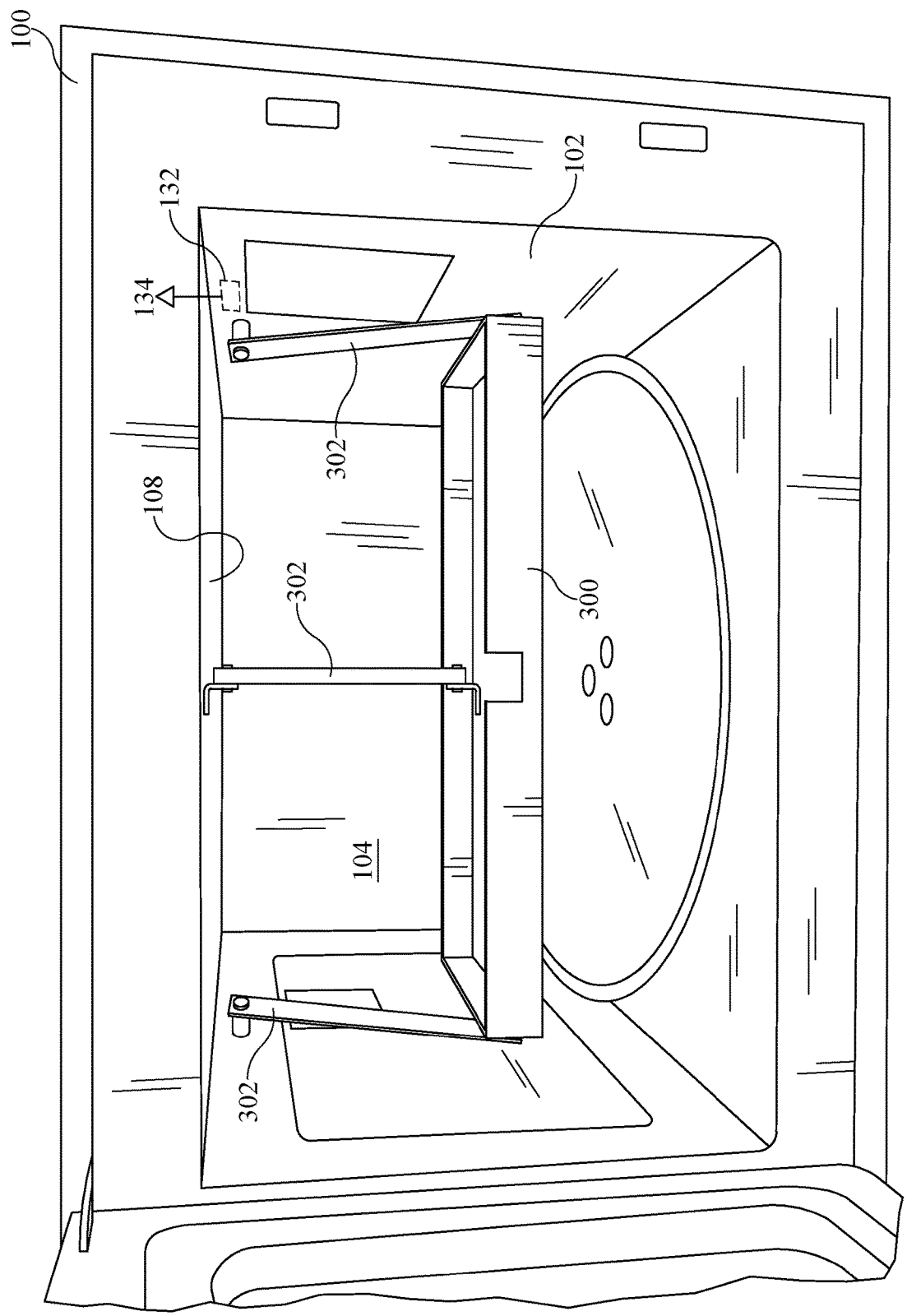
FIG. 9 is a perspective view of a microwave toaster oven in accordance with various embodiments.
Figure 10:
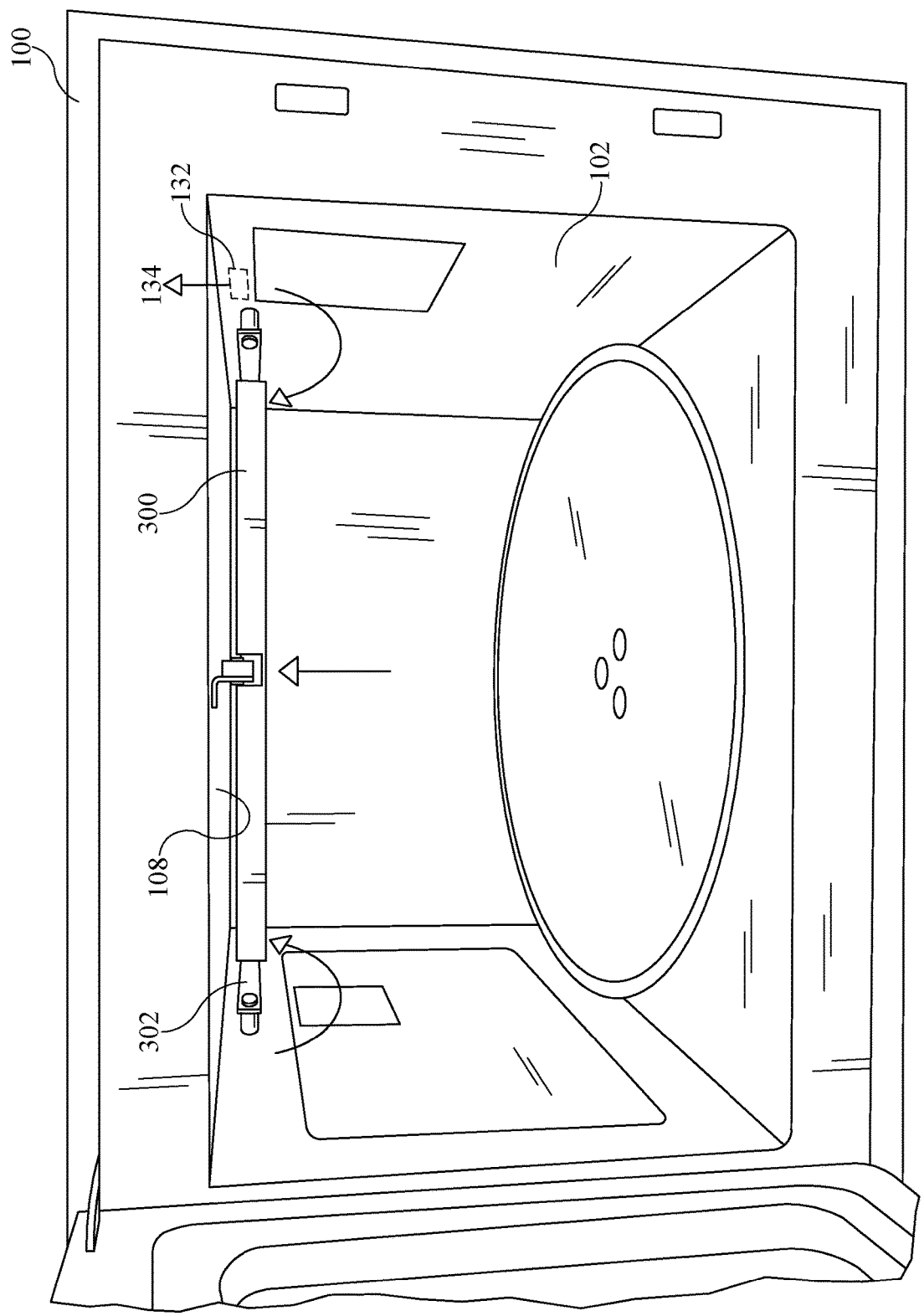
FIG. 10 is a perspective view of a microwave toaster oven in accordance with various embodiments.
Figure 11:
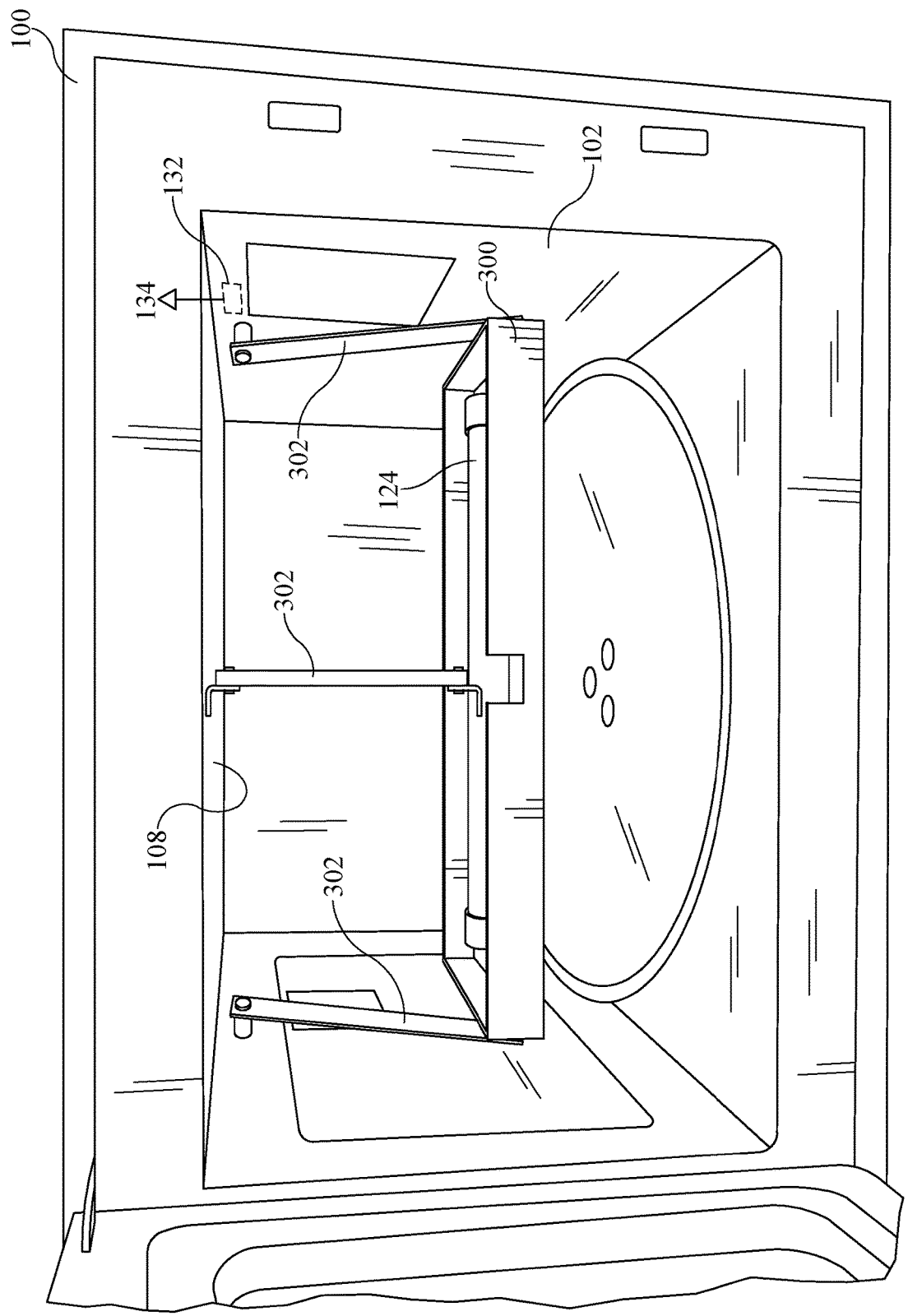
FIG. 11 is a perspective view of a microwave toaster oven in accordance with various embodiments.

Referring now to FIGS. 9-13 and in accordance with various embodiments microwave oven 100 may be equipped with a drop-down tray 300 that is capable of being positioned in an open (toast) position as depicted in FIG. 9, or a closed position as depicted in FIG. 10. In some embodiments a switch 132, for example a limit or proximity switch 132 is mounted to sense the opening and closing of drop-down tray 300. Switch 132 may provide an output 134 to an input 220 of controller 200 that is indicative of tray 300 being in a closed position. Controller 200 includes instructions to disable the operation of microwave 100 unless switch 132 indicates that drop-down tray 300 is in the up or stowed position, thereby providing for safe operation of both ovens.

Figure 12:
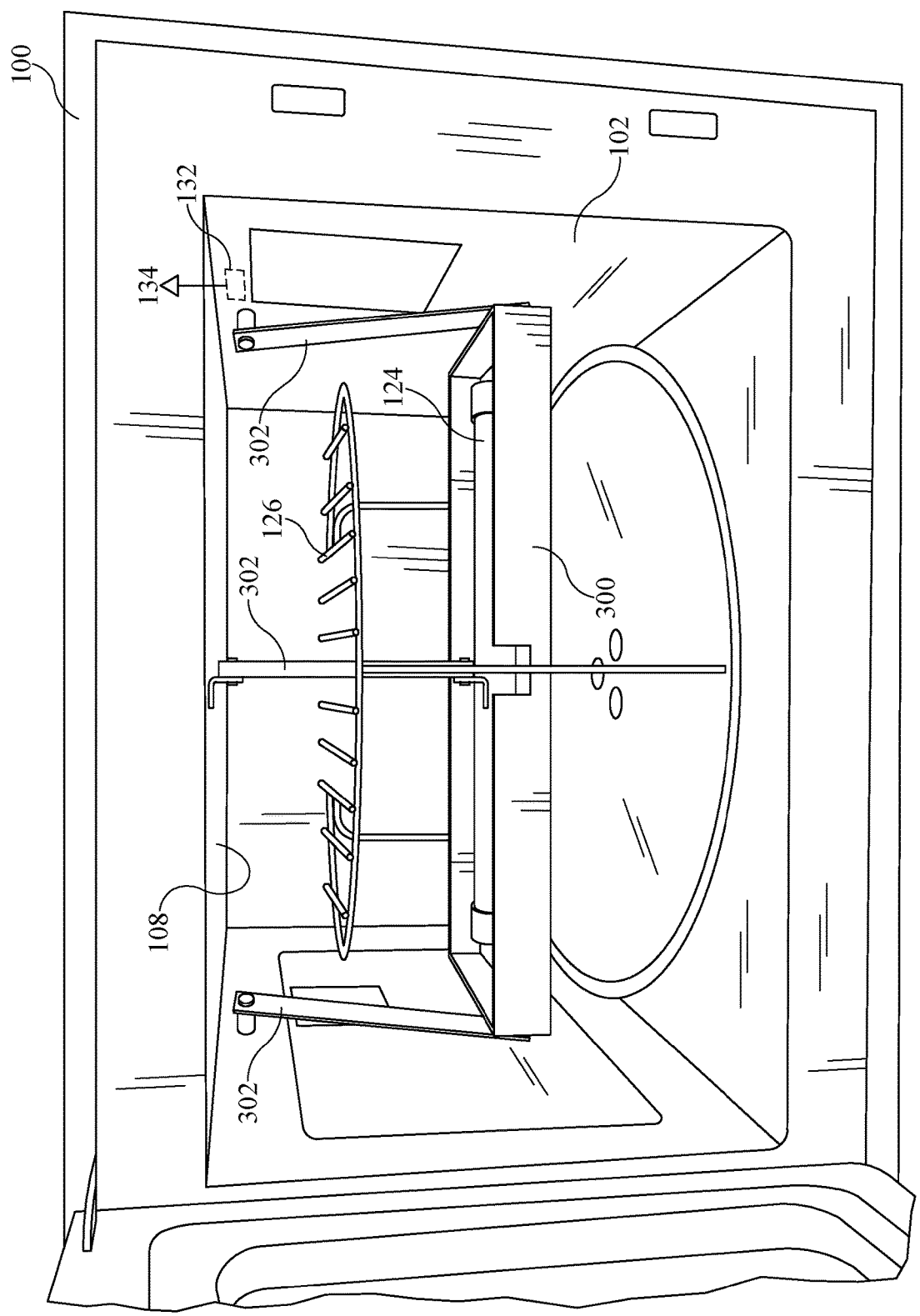
FIG. 12 is a perspective view of a microwave toaster oven in accordance with various embodiments.
Figure 13:
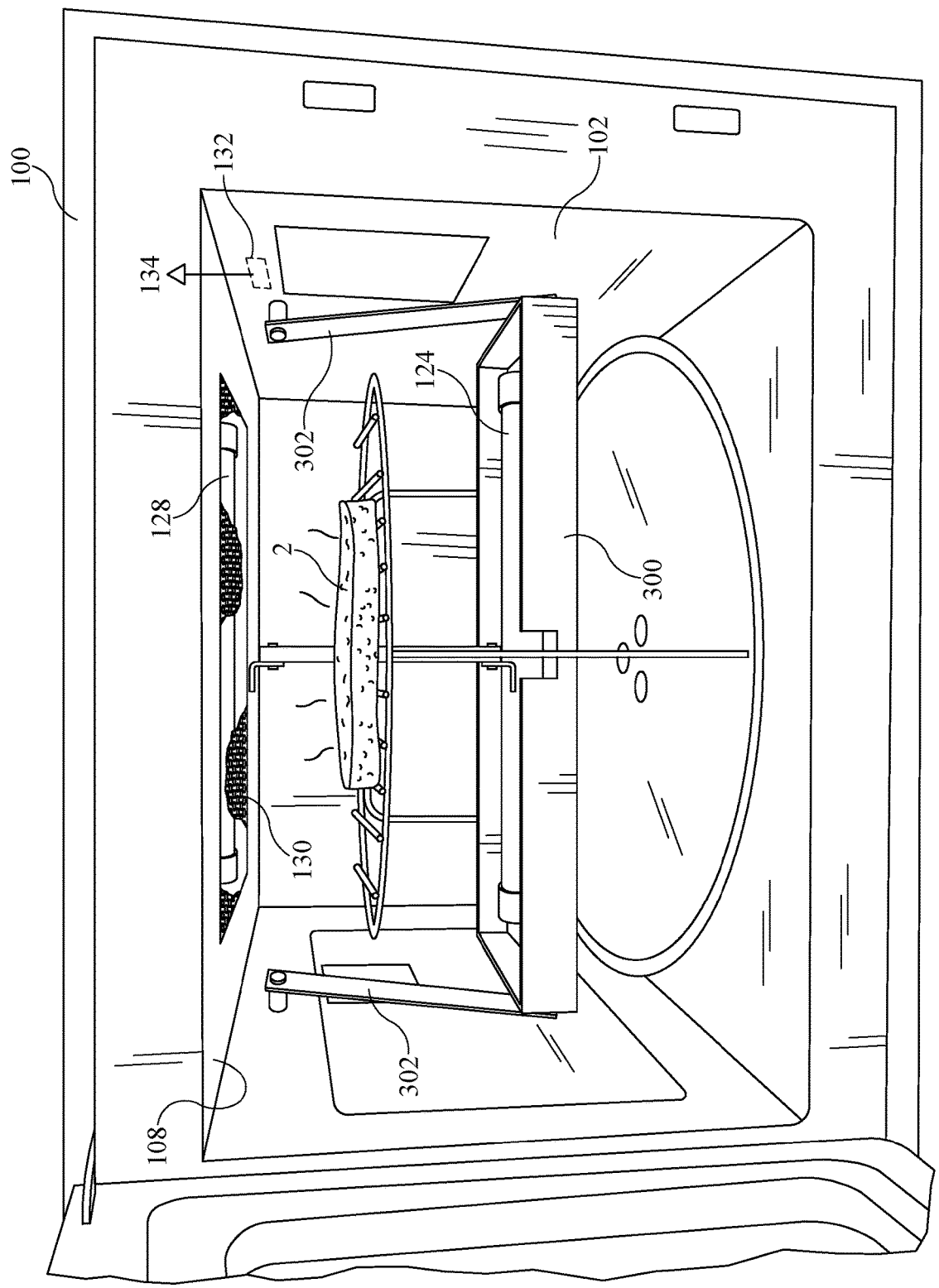
FIG. 13 is a perspective view of a microwave toaster oven in accordance with various embodiments.

Drop-down tray 300 is secured to an upper portion of interior 102 by a plurality of pivot arms 302 that extend to an open or deployed position to lower drop-down tray 300 into position. As best seen in FIG. 11-14 lower heating element 124, or a plurality thereof, are mounted in drop-down tray 300. Power may be supplied to heating elements 124 by a controller 200 output 210. In one embodiment of the invention, power wiring or conductors may be routed as an integral part of pivot arms 302. As with prior embodiments, upper element 128 may be positioned in a top portion of oven 110 with the attendant grid 130 for microwave radiation protection, as depicted in FIG. 13. In various non-limiting embodiments as depicted in FIGS. 12 and 13, a wire rack 126 may be provided in drop-down tray 300, onto which a food item 2 may be placed for toasting. In some embodiments drop-down tray may include a reflective surface 129 or surfaces for directing heat from lower heating elements 124 upwardly toward food item 2.

Figure 14:
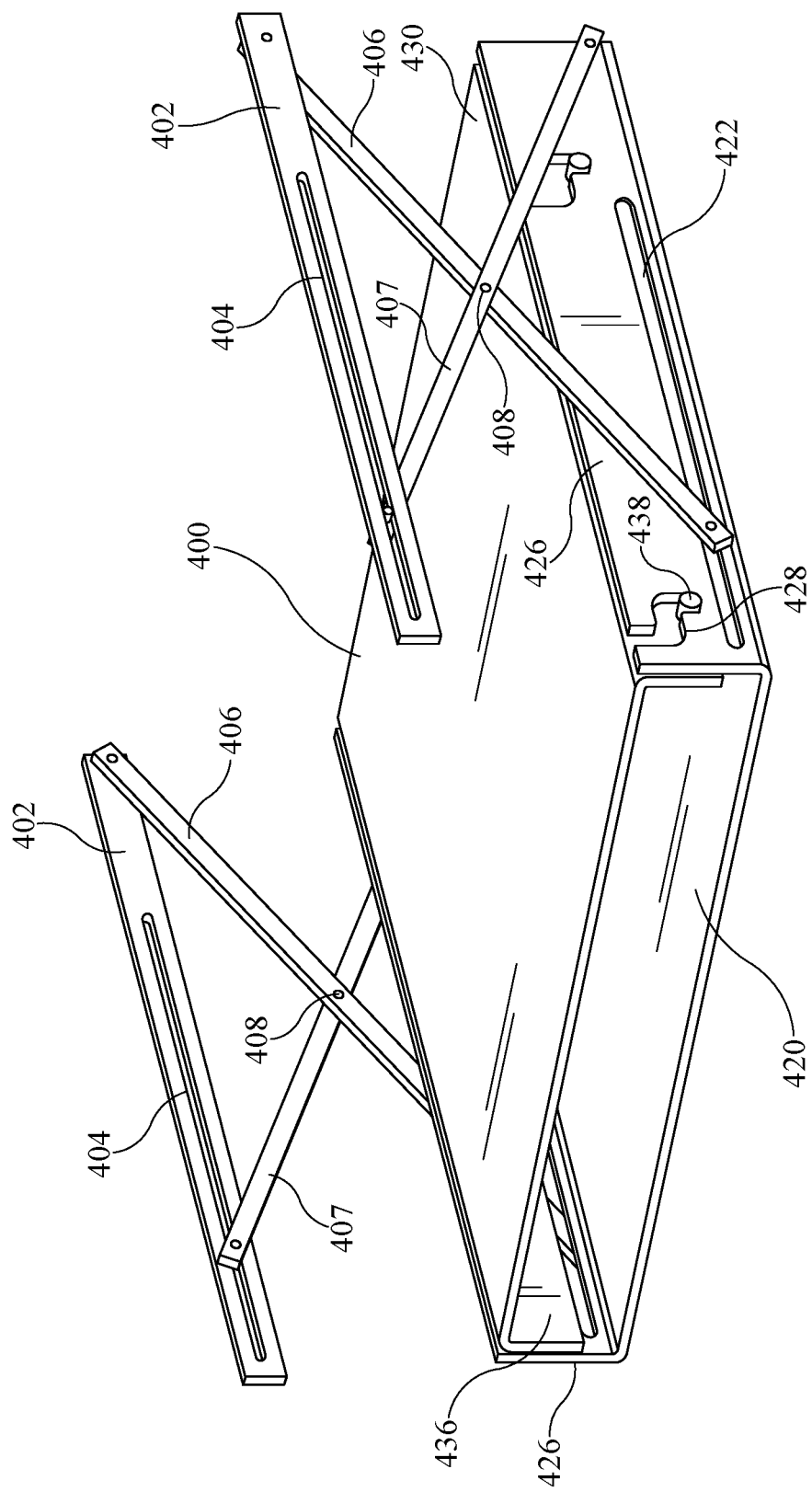
FIG. 14 is a perspective view of a microwave toaster oven in accordance with various embodiments.
Figure 15:
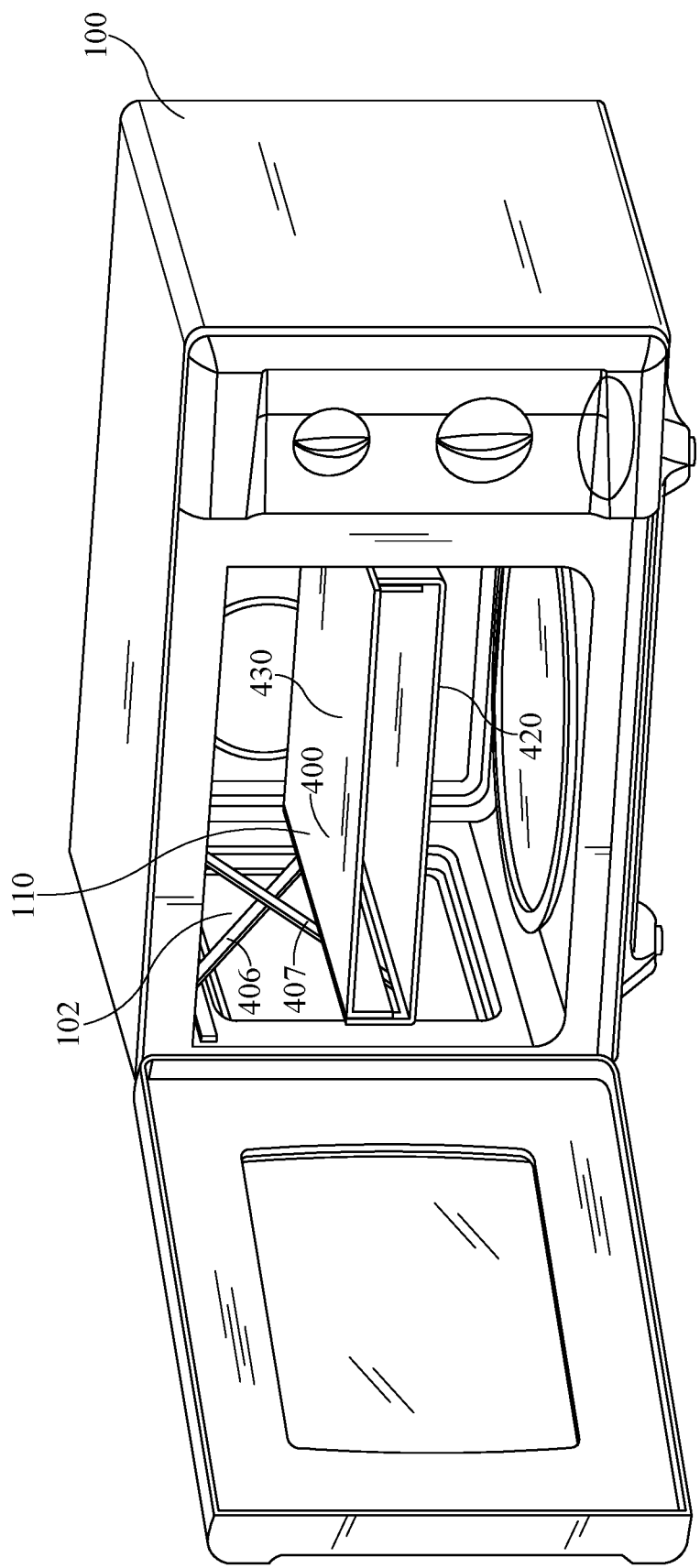
FIG. 15 is a perspective view of a microwave toaster oven in accordance with various embodiments.

Referring now to FIGS. 14-15 and in one non-limiting exemplary embodiment for purposes of illustration in this specification, a drop-down toaster compartment 400 is provided that may be mounted in the interior 102 of microwave oven 100. Drop down toaster compartment 400 includes a pair of spaced mounting linkages 402 that may in some embodiments be shaped as a rail 402 having a slot 404 therein. Mounting linkages 402 are secured to the top sides of the oven 100 interior 102, as depicted in FIG. 15. Two pairs of lift arms 406, 407 are secured to mounting linkages 402 such that a top end of one arm 406 is pivotally secured thereto while a top end of a second arm 407 is slidably engaged by slot 404. Each pair of lift arms 406, 407 are pivotally secured near the middle 408 thereof, so that each pair essentially forms a scissor for raising and lower toaster compartment 400.

Toaster compartment 400 is formed of a lower tray and integral heating element 420 and an upper tray and integral heating element 430. Lower tray 420 is provided with a pair of spaced slots 422 on opposed sides that engage a second end of one lift arm 406. The second end of the other lift arm 407 is then secured at a point to lower tray 420, so each pair of lift arms 406, 407 operates as a scissors lift to lower and raise toaster compartment 400. Lower tray and heating element 420 further includes a pair of opposed sides 426 that include a shaped slot 428 therein used to vary compartment 400 size to accommodate different foods. Upper tray and heating element 430 also includes a pair of opposed sides 436 that engage that opposed sides 426 of lower tray 420. Upper tray 430 also includes a pair of adjustment pins 438 that engage temperature adjustment slots 428, such that the upper tray 430 and lower tray 420 may be spaced from each other at a plurality of distances to increase or decrease the heat supplied to a food item placed in toaster compartment 400.

In a yet further embodiment of the invention, electrical power may be supplied to lower and upper trays 420, 430 through lift arms 406, 407 by a controller 200 output 210. In one embodiment of the invention, power wiring or conductors may be routed as an integral part of lift arms 406, 407, and be conducted through the fasteners and rivets used to secure arms 406, 407 to upper and lower trays 430, 420 respectively.

Figure 17:
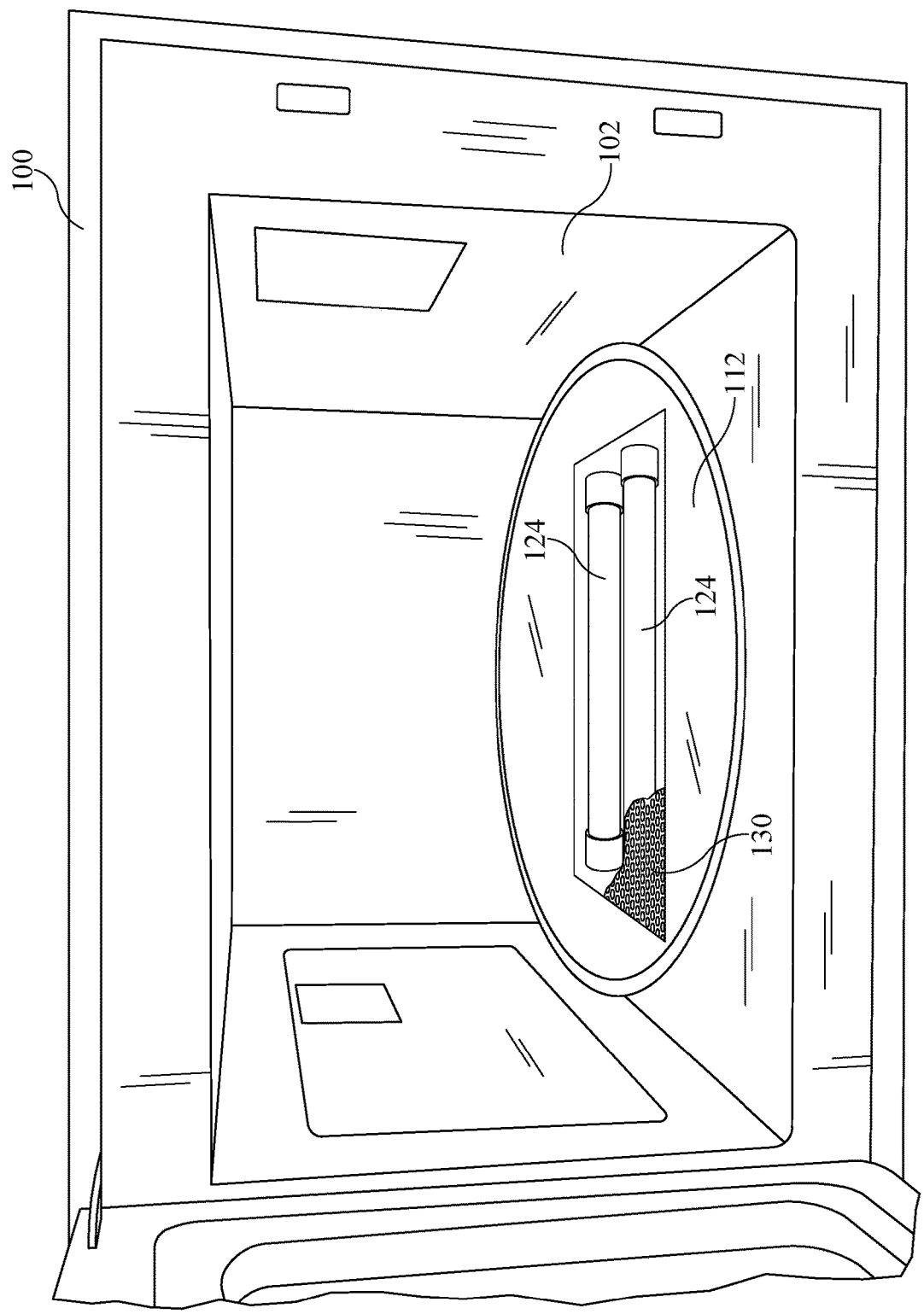
FIG. 17 is a perspective view of a microwave toaster oven in accordance with some aspects and embodiments.
Figure 18:
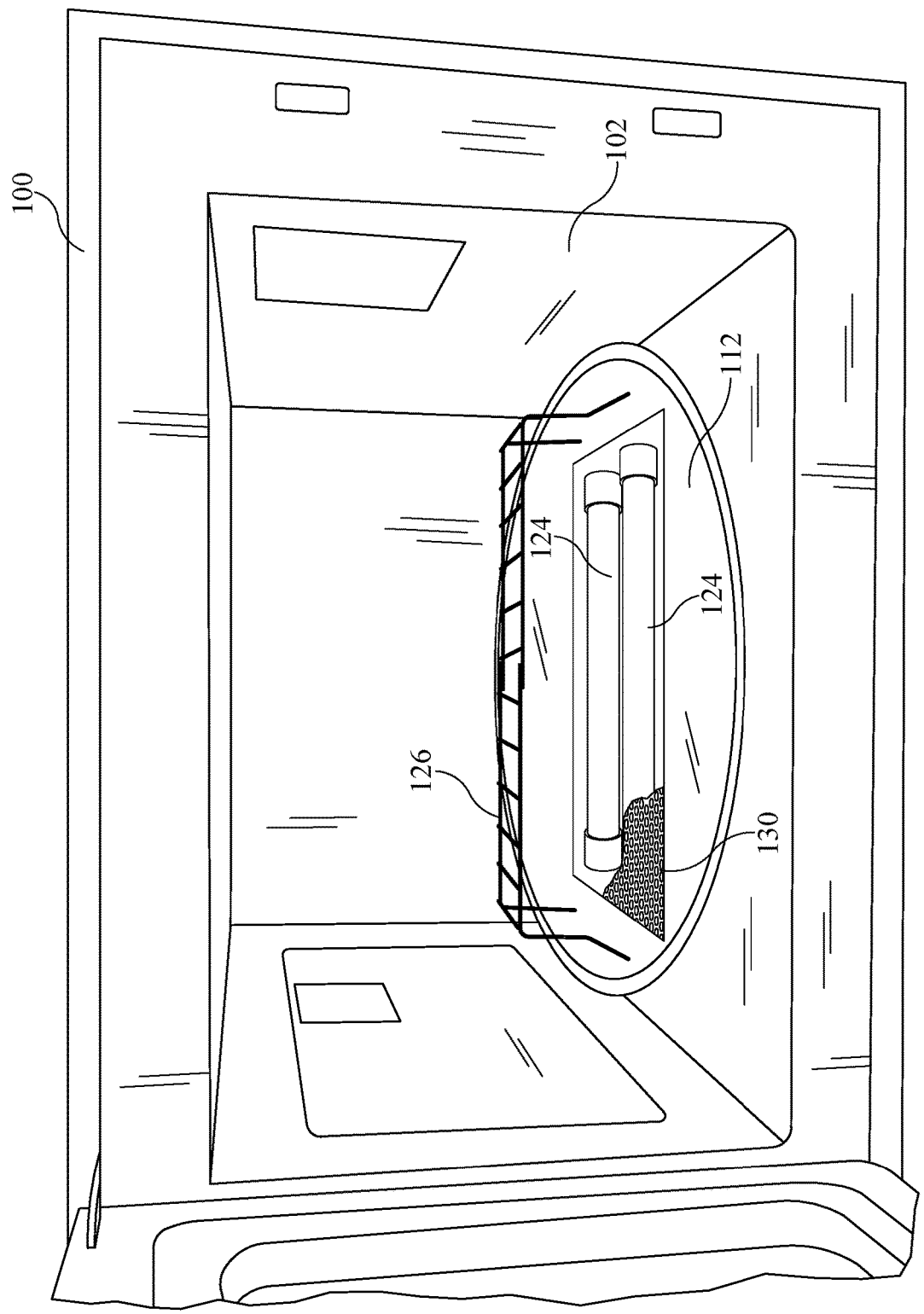
FIG. 18 is a perspective view of a microwave toaster oven in accordance with some aspects and embodiments.

As best seen in FIGS. 17-18, and in accordance with some embodiments microwave 110 may include a glass floor 112, or a portion of glass floor 112, that covers a recess 114 into which lower heating element 124 may be positioned. A metal mesh grid 130 is provided beneath glass floor 112 to cover lower heating element 124, such that mesh grid 130 blocks microwave radiation from reaching heating element 124. Glass floor permits heat radiation from heating element 124 to radiate upwardly as well as protecting lower element 124 from spills, food particles and the like, and a wire rack 126 positioned above and spaced away from lower heating element 124 facilitates placement of a food item for toasting. As depicted in FIG. 4 and described herein above, an upper heating element 128 is also provided, recessed in a top wall 108 of oven 100, for heating food placed on rack 126 from above. In this embodiment of the invention, the toaster 110 is provided integrally to the microwave 100 interior 102, since both the upper 128 and lower 124 heating elements are recessed into the upper and lower surfaces of microwave 100 interior 102. A user need only place the rack 126 in the microwave 100 interior 102 to toast or cook an item. In some aspects and embodiments, controller 200 is provided with a suitable instruction set that prohibits the operation of toaster 110 when microwave oven 100 is being used While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A microwave oven and toaster combination appliance wherein a microwave oven includes an interior having a top, bottom, back and opposed side walls comprising:
   a slide out tray having a closed position proximate the back of said oven interior and slidable to a deployed position in said oven interior;
   a lower heating element mounted to said slide out tray; and
   an upper heating element spaced from said lower heating element proximate the top of said oven interior.

2. The appliance of claim 1 wherein said upper heating element is recessed in said oven top.

3. The appliance of claim 2 comprising:
   a mesh grid for blocking microwave radiation secured below said upper heating element.

4. The appliance of claim 1 comprising:
   a controller having a processor and concomitant data memory and a user interface, said controller having a plurality of inputs and outputs for receiving and providing electrical signals to a plurality of electrical components of said appliance, and wherein said controller provides an output to provide electrical power to said heating elements responsive to an input from said user interface.

5. The appliance of claim 4 wherein said controller prohibits simultaneous operation of said heating elements and said microwave oven.

6. A microwave oven and toaster combination appliance wherein a microwave oven includes an interior having a top, bottom, back and opposed side walls comprising:
   a hinged door recessed within the back of said interior, said hinged door capable of being opened to a deployed position;
   a lower heating element secured to said door whereby said heating element is positioned essentially horizontally when said door is deployed; and
   an upper heating element disposed proximate the top of said oven interior spaced from said lower heating element.

7. The appliance of claim 6 comprising:
   a mesh grid for blocking microwave radiation secured below said upper heating element.

8. The appliance of claim 7 wherein said upper heating element and said mesh grid are recessed within the top of said oven.

9. The appliance of claim 6 comprising:
   a reflective surface secured to said hinged door to direct heat from said lower heating element to a food item.

10. The appliance of claim 9 comprising:
    a controller having a processor and concomitant data memory and a user interface, said controller having a plurality of inputs and outputs for receiving and providing electrical signals to a plurality of electrical components of said appliance, and wherein said controller provides an output to provide electrical power to said heating elements responsive to an input from said user interface.

11. The appliance of claim 10 comprising:
    a sensor for detecting an open position of said door having an output representative thereof operatively coupled to an input of said controller, whereby said controller prohibits operation of said microwave oven when said door is open.

12. The appliance of claim 11 comprising:
    a rack secured to said door in spaced relation to said lower heating element for supporting a food item.

13. A microwave oven and toaster combination appliance wherein a microwave oven includes an interior having a top, bottom, back and opposed side walls comprising:
- a drop down tray secured to the top of said oven interior by a plurality of pivot arms extending from the top of said oven, said tray capable of being opened to a deployed position or secured to a closed position;
- a lower heating element secured to said drop down tray whereby said heating element is positioned essentially horizontally when said tray is deployed; and
- an upper heating element disposed proximate the top of said oven interior spaced from said lower heating element.

14. The appliance of claim 13 comprising:
- a mesh grid for blocking microwave radiation secured below said upper heating element.

15. The appliance of claim 14 wherein said upper heating element and said mesh grid are recessed within the top of said oven.

16. The appliance of claim 13 comprising:
- a reflective surface secured to said drop down tray to direct heat from said lower heating element to a food item.

17. The appliance of claim 13 comprising:
- a controller having a processor and concomitant data memory and a user interface, said controller having a plurality of inputs and outputs for receiving and providing electrical signals to a plurality of electrical components of said appliance, and wherein said controller provides an output to provide electrical power to said heating elements responsive to an input from said user interface.

18. The appliance of claim 17 comprising:
- a sensor for detecting an open position of said drop down tray having an output representative thereof operatively coupled to an input of said controller, whereby said controller prohibits operation of said microwave oven when said drop down tray is in an open position.

19. The appliance of claim 18 comprising:
- a rack secured to said drop down tray in spaced relation to said lower heating element for supporting a food item between said lower element and said upper element.

* * * * *